United States Patent [19]

Huse

[11] 3,956,072
[45] May 11, 1976

[54] VAPOR DISTILLATION APPARATUS WITH TWO DISPARATE COMPRESSORS

[75] Inventor: Henry Huse, Darien, Conn.

[73] Assignee: Atlantic Fluidics, Inc., Stamford, Conn.

[22] Filed: Aug. 21, 1975

[21] Appl. No.: 606,521

[52] U.S. Cl. .............................. 202/177; 202/180; 202/185 A; 202/235; 202/236; 203/23; 203/26; 159/24 R; 417/199 R
[51] Int. Cl.² ........................................ B01D 1/28
[58] Field of Search............ 417/199 R; 203/26, 24, 203/23, 88, 90; 202/177, 180, 185 A, 235, 236; 159/24 R

[56] References Cited
UNITED STATES PATENTS

| | | | |
|---|---|---|---|
| 849,579 | 4/1907 | Siebel | 203/26 |
| 1,461,640 | 7/1923 | Wirth-Frey | 203/26 |
| 2,863,501 | 12/1958 | Farnsworth | 203/26 |
| 2,895,546 | 7/1959 | Sadtler | 203/26 |
| 3,192,130 | 6/1965 | Pottharst, Jr. | 203/26 |
| 3,226,306 | 12/1965 | Hausner | 203/26 |
| 3,236,748 | 2/1966 | Pottharst, Jr. | 203/26 |

Primary Examiner—Wilbur L. Bascomb, Jr.

[57] ABSTRACT

A vapor compression distillation system utilizing a two stage vapor compressor comprising a rotary positive displacement first stage compressor backed by a second stage liquid ring compressor.

8 Claims, 4 Drawing Figures

3,956,072

VAPOR DISTILLATION APPARATUS WITH TWO DISPARATE COMPRESSORS

BACKGROUND OF THE INVENTION

Although the vapor compression distillation process is recognized as thermodynamically very efficient, the development of the vapor compression process has lagged behind multiple effect flash evaporation. The lack of usage of vapor compression distillers on a large scale is primarily the result of the limitations of mechanical compressors.

Most small vapor compression distillers employ rotary positive displacement compressors of the Roots type. These compressors are designed for low pressure differential and they are limited to approximately 10 psi compression. In practice, because of high heat build-up and slippage losses they are generally limited in use to employment for compression up to approximately 6 psi.

Large vapor compression systems employ centrifugal displacement compressors in single or multi-stage arrangement. Single stage compressors are limited to low pressure differential, requiring large heat exchanger surface. Multi-stage compressors operate on higher pressure differential, but because of high temperature rise due to adiabatic compression the efficiency is not good and heat build-up produces mechanical problems.

Liquid ring compressors have been employed on small vapor compression distillers, but their efficiency is not good, and they are limited in operation to low pressure differential because the liquid compression medium is constantly being pressurized and depressurized causing alternate internal condensing and flashing of vapor. For a given displacement the physical size of liquid ring compressors is large in comparison with other types.

Piston compressors are seldom used because of large mass, slow speeds, and poor efficiency. Sliding vane and other types of compressors requiring internal lubrication cannot be used in many applications because the presence of oil in the vapor has a detrimental effect on heat transfer, in addition to contaminating the product distillate.

SUMMARY OF THE INVENTION

The vapor compression distillation system described herein makes use of a unique and highly efficient vapor compressor. The compressor utilizes a rotary positive displacement first stage backed by rotary liquid ring second stage compressor, the combination of which provides high pressure differential and high compression ratio, and delivery of saturated steam, eliminating desuperheaters. Because of the high compression ratio obtainable the vapor compressor can be operated with subatmospheric suction pressure.

The two-stage vapor compressor is ideally suited for compressing saturated vapor extracted from the evaporator section of the distiller. The first stage rotary positive displacement pump achieves high efficiency when displacing large volumes of vapor over a low pressure differential. The liquid ring second stage pump provides several functions: It acts as a desuper-heater so that vapor delivered is saturated. It provides a secondary compression stage which increases pressure differential and hence reduces heat exchanger surface requirements, and it acts as a supplementary direct contact condenser which enhances the performance of the heat exchanger in the evaporator section.

The two-stage vapor compression system is adaptable to high temperature or low temperature distillation. It is in the low temperature range that the advantages are most apparent. The thermodynamic advantages of low temperature operation are, (a) lower boiling point elevation of the brine solution with the result that available temperature differential on the heat exchanger surface is increased for a given pressure and hence the heat transfer is increased, (b) a higher temperature differential is attained for a given pressure increase across the compressor. This provides a higher heat transfer rate with a correspondingly reduced heat transfer surface requirement. Alternately, the compressor can be operated with lower pressure differential with correspondingly increased heat transfer surface, (c) radiation losses to ambient are decreased. Low temperature operation also has significant mechanical advantages: (a) scaling on heat exchanger surfaces is decreased with decrease in temperature, (b) compressors operate at lower temperatures and hence mechanical reliability is enhanced, (c) compressors can operate at lower pressure differential, and mechanical energy is reduced.

In this invention the advantages of both the rotary positive displacement and liquid ring compressors can be exploited to achieve performance superior to other types of compressors. The rotary positive displacement compressor, which can be of the lobe or screw type, is extremely efficient when compressing large volumes of gas or vapor over a low pressure differential. The power input is a direct function of the pressure differential. Liquid ring compressors when applied to low pressure or subatmospheric pressure conditions have a relatively constant power requirement which is not materially affected by increase or decrease in pressure differential or compression ratio. The gas or vapor being compressed is in intimate contact with the liquid sealing fluid within the pump, and therefore the heat of compression and condensation is absorbed by the seal liquid. Thus, gas or vapor discharged from the liquid ring compressor is essentially saturated. Furthermore, liquid ring compressors have the unique ability to handle water or liquid in substantial quantity without damage.

In combination the two compressors operate in complimentary fashion. The first stage positive displacement compressor extracts a large volume of vapor from the evaporator and compresses it adiabatically to a pressure a few pounds higher than the inlet condition. The heat of compression elevates the vapor temperature and it is discharged superheated at higher pressure and temperature. In combination with the second stage liquid ring compressor water (distillate) is injected into the interstage between the two compressors, desuperheating the vapor and reducing its volume accordingly. The vapors are then pumped by the second stage liquid ring compressor to the final discharge pressure where seal water and vapor are discharged into the evaporator coil, the vapor condensing therein and giving up heat to the brine through the heat exchanger surface. During compression in the liquid ring compressor condensation occurs until liquid-vapor equilibrium is established, and thus the compressor also acts as a direct contact condenser, permitting reduction in heat transfer surface area in the evaporator coil.

One of the most important advantages of the invention is that the unique two stage compression system is capable of operating at vacuum conditions with atmospheric discharge pressure, which cannot be achieved by any of the other vapor compressors in current use.

By way of example, the rotary positive displacement compressor is capable of compressing up to approximately 10 psi, or 20 inches Hg., although in practice a 5 or 6 psi pressure rise is considered optimum. Assuming an evaporator pressure of 5 psia the saturated vapor temperature is 163° F. With the rotary positive displacement first stage compressor boosting the pressure by 5 psia to 10 psi the resultant saturated vapor temperature becomes 193° F, a temperature rise of 30° F. By the same basis, if the evaporator pressure is 14.7 psia (atmospheric pressure) with a saturation temperature of 212° F. a 5 psi pressure increase will raise the saturated vapor temperature to 227° F, a temperature rise of 15° F. Thus, it can be seen that the heat transfer differential in the low pressure and low temperature operation is double that of the high pressure operation, resulting in greatly increased heat transfer efficiency.

In combination with the liquid ring compressor the pressure boost in the first example given above can be extended to atmospheric pressure, or higher, resulting in a final saturated vapor temperature of 212° F or a total temperature differential of 49° F which is significantly higher than the temperature boost obtainable by other means. Thus, the two stage rotary positive displacement and liquid ring compressor combination makes possible operation over a saturated vapor temperature differential unobtainable by other adiabatic compression means.

More specifically this invention is directed to a two stage vapor compression system having in combination a rotary positive displacement compressor as a first stage, a liquid ring compressor second stage, evaporator vessel, distillate receiver vessel, distillate and brine pumps, heat exchangers, and all interconnecting piping, comprising a highly efficient and reliable vapor compression distillation system which is operable over a large range of temperatures and pressures.

An important element of the system is the unique two-stage vapor compressor which can be adapted to evaporator types such as submerged tube, spray film, long tube vertical, wiped film, forced-circulation or other heat exchange methods.

The system is adaptable to operation with the evaporator at vacuum conditions (low temperature) or pressures above atmospheric. The two-stage vapor compressor maintains equilibrium at all conditions of operations due to the ability of the liquid ring compressor to desuperheat and condense vapor delivered by the first stage.

The two-stage vapor compressor has the unique ability to operate the evaporator at either negative or positive pressure. Because of the extremely large pressure differential made possible by the novel two-stage vapor compressor the discharge pressure is always at atmospheric pressure or greater, and therefore air and non-condensibles are extracted and discharged to atmosphere without the use of air ejectors, vacuum pumps, eductors, or other means.

By discharging distillate at atmospheric, or higher, pressure the distillate pump may be of a very simple and inexpensive type because it does not require a low NPSH (net positive suction head) characteristic as is required when distillate is under vacuum.

A significant advantage of the vapor compression system described herein is that the compressor can be started on a cold evaporator and no warm-up period is required prior to starting. The vapor compression system starts making distillate immediately upon energizing the vapor compressor motor, and no external heat source is required.

Low temperature operation made possible and practical by the two-stage vapor compressor provides the advantage of reducing scaling (particularly on sea water applications), and may in many cases eliminate the need for scale retarding chemicals or periodic discaling with acid. Also, in many applications involving temperature sensitive pharmaceuticals or foods the low temperature requirements are effectively met. The two-stage vapor compressor may be provided with separate motor drives for each stage, or both stages can be operated by a single motor through coupling, V-belt, gear drive, or a combination thereof. The control means which form a part of this invention can be effected by bypass control valves around either or both stages, speed control means such as constant torque drives, or other means most suitable for the specific application.

DESCRIPTION OF THE PREFERRED EMBODIMENT

Figure 1:
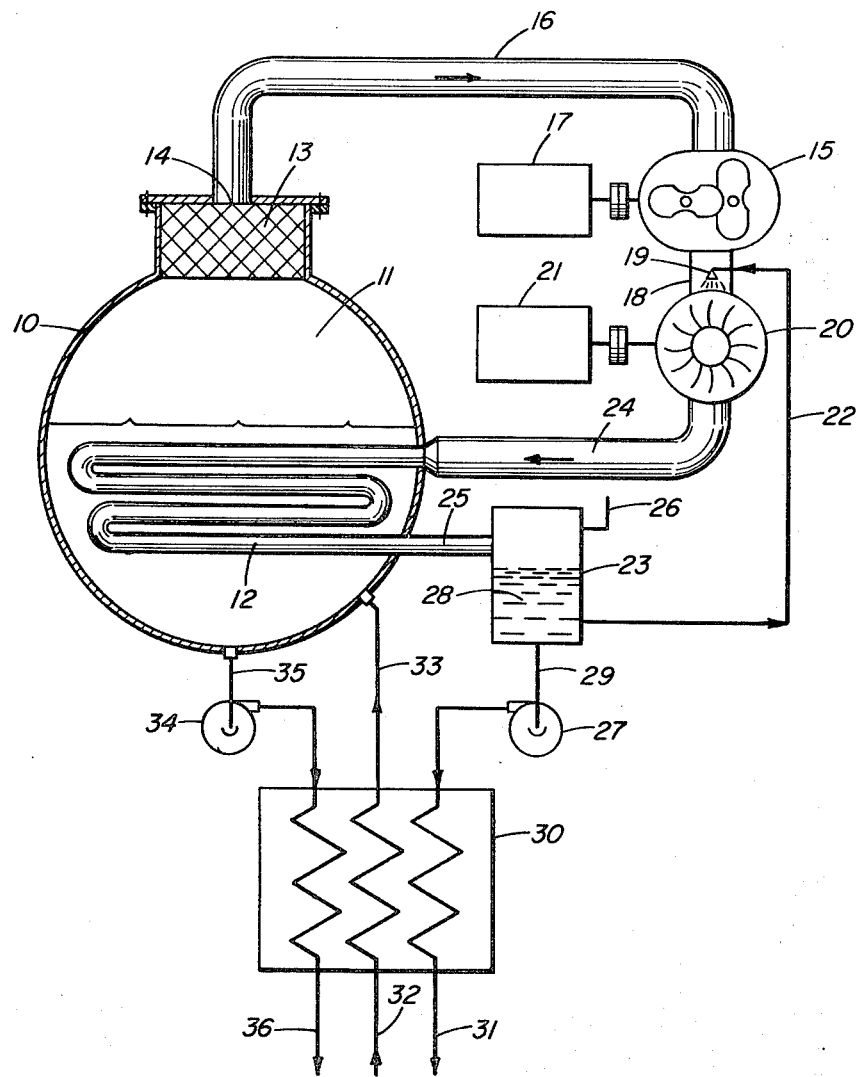
FIG. 1 is a diagrammatic showing of a two-stage vapor compression system according to this invention, of the submerged tube type.

A vapor compression system of the submerged tube type incorporating my invention is shown in diagrammatic form in FIG. 1 wherein the evaporator vessel 10 having interior 11 contains heat exchange tubes 12 and a demister 13 shown at the outlet 14 thereof. The interior 11 is communicated at outlet 14 to the first stage rotary positive displacement compressor 15 by conduit 16. The compressor 15 is driven by a motor designated in the Figures by the numeral 17. Interstage conduit 18 within which spray nozzle 19 is provided communicates compressor 15 with the second stage ring compressor 20 driven by motor 21. Spray nozzle 19 is supplied via conduit 22 with distillate from vessel 23.

Conduit 24 communicates the liquid ring compressor 20 with heat exchange tubes 12 and conduit 25 communicates distillate vessel 23 with the remaining end of the heat exchange tubes. Vessel 23 is provided with vent 26.

Pump 27 is provided for pumping distillate 28 from vessel 23 via conduit 29 to heat exchanger 30 from where it can be delivered via conduit 31 to storage or use.

Conduit 32 allows incoming feedwater to enter the heat exchanger 30 and exit via conduit 33 to receive heat given up by the distillate as it passes through the heat exchanger via conduit 31.

Solution pump 34 is provided to continuously pump solution or brine via conduit 35 from vessel 10 through heat exchanger 30 and via conduit 36 to drain or waste.

In operation of the system of FIG. 1 seawater, or solution, is heated in vessel 10 to its flash point and vapors formed in the interior vapor chamber 11 are drawn through demister 13 and conduit 16 to the first stage rotary positive displacement compressor 15 driven by motor 17 where the vapors are compressed and delivered at higher pressure and temperature to interstage conduit 18. The vapor is superheated during compression in first stage compressor 15.

A spray nozzle 19 in the interstage conduit 18 is provided to spray distillate supplied via conduit 22 into the superheated vapor stream. The introduction of water in the gas stream desuperheats it with resultant reduction of vapor volume.

The saturated vapor and distillate is then drawn into second stage liquid ring compressor 20 driven by motor 21. There it is compressed while in intimate contact with the entering distillate. During compression a portion of the vapor is condensed, giving up heat and reducing the volume of vapor to be handled by the liquid ring compressor. The vapor, with some of the liquid, is discharged through conduit 24 into the heat exchange tubes 12 in the evaporator vessel 10. There the higher temperature liquid gives up sensible heat and the vapor gives up latent heat to the heat exchanger surface on the tubes 12 by condensation. The heat given up is absorbed by the solution and thus the heat of vaporization, plus heat of compression, is put back into the solution in the vessel 10.

The distillate discharged from tubes 12 flows into distillate vessel 23 which is provided with vent conduit 26 which discharges air and non condensible gases from the system. Distillate 28 is collected in the distillate vessel 23 and part of it is transmitted via conduit 22 to the vapor compressor interstage conduit 18 and spray nozzle 19. The balance of the distillate (or product) is pumped by distillate pump 27 via conduit 29 through heat exchanger 30 and via conduit 31 to storage or use.

As it passes through heat exchanger 30 the distillate gives up heat to the incoming feedwater which enters heat exchanger 30 through conduit 32 and exits via conduit 33, and then enters the evaporator vessel 10 and makes up the losses of solution caused by production of distillate and discharge of concentrated drive.

In order to maintain an optimum solution concentration solution pump 34 continuously pumps solution, or brine, via conduit 35 from evaporator vessel 10 through heat exchanger 30 and via conduit 36 to drain or waste. The heat exchanger 30 is so designed that flow of hot brine and distillate is counter to the flow of incoming feedwater, and the hot distillate and brine give up heat to preheat the feedwater prior to its introduction in the evaporator vessel 10.

The invention is not limited solely to submerged tube evaporators as shown in FIG. 1. The unique two-stage vapor compressor is equally adaptable to other arrangements such as the forced brine circulation system as shown in FIG. 2 and other types.

Figure 2:
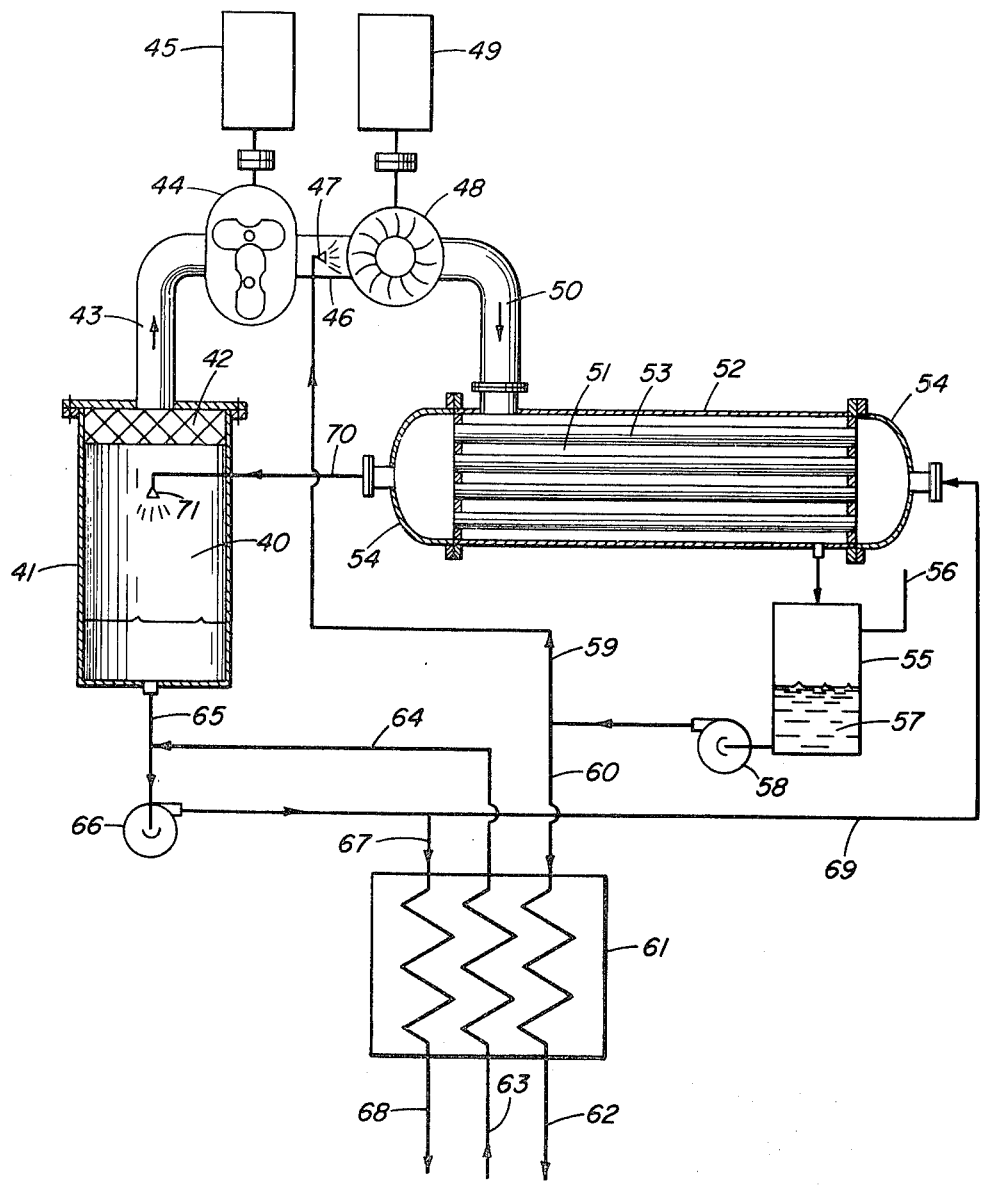
FIG. 2 is a diagrammatic showing of a two-stage vapor compression system according to this invention of the forced circulation type.

In FIG. 2 a vapor compression system of the forced brine circulation type incorporating the invention is shown in diagrammatic form.

In this embodiment vapor formed in the chamber 40 of evaporator vessel 41 flows through demister 42 and conduit 43 to the first stage rotary positive displacement compressor 44 driven by motor 45 where the vapors are compressed adiabatically and delivered at higher pressure and temperature to interstage conduit 46. The spray nozzle 47 provides a means of contacting the superheated vapor with distillate and desuperheating and reducing the volume of vapor.

The saturated vapor then enters second stage liquid ring compressor 48 which is driven by motor 49. There it is compressed while in intimate contact with the entering distillate. During compression a portion of the saturated vapor is condensed, giving up heat and reducing the volume of vapor to be handled by the liquid ring compressor.

The vapor and a portion of the sealing liquid is discharged through conduit 50 into condenser 51 consisting of outer shell 52, internal tube bundle 53 and bonnets 54. The vapor is condensed in the condenser 51 giving up heat to recirculated brine solution.

Distillate is allowed to flow into distillate receiver tank 55 which is provided with vent conduit 56 for discharging air and non condensibles to atmosphere. Distillate 57 collected in the receiver tank 55 is pumped by pump 58 partially via conduit 59 to interstage spray nozzle 47 and partially via conduit 60 through heat exchanger 61 and conduit 62 to storage and use.

As it is passed through heat exchanger 61 the distillate gives up heat to the incoming feedwater entering via conduit 63 and discharging via conduit 64 into solution recirculation conduit 65 where it mixes with solution pumped from evaporator 41 by solution pump 66.

The solution is partially pumped through conduit 67 through heat exchanger 61 and conduit 68 to drain and disposal.

The balance of the solution is pumped via conduit 69 to condenser 51 and through tube bundle 53 where the brine absorbs heat given up by vapor condensed and distillate discharged from second stage compressor 48 via conduit 50.

The solution, having been heated then flows through conduit 70 and through spray nozzle 71 into evaporator chamber 40, where upon drop in pressure the vapor flashes out of solution and concentrated solution is diluted by feedwater and can be recycled.

Figure 3:
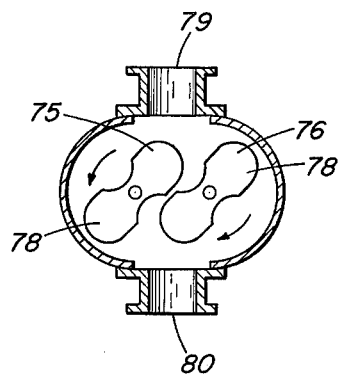
FIG. 3 is a side sectional view of the first stage rotary positive displacement compressor utilized in the systems shown in FIGS. 1 and 2.

The compressors identified in FIG. 1 by the numeral 15 and in FIG. 2 by the numeral 44 are identical and shown in FIG. 3 as a rotary positive displacement compressor of the Roots type. It consists of two counter-rotating rotors 75 and 76 matched to rotate together in counter-rotation without metal-to-metal contact. The vapor is trapped by intermeshing lobes 78 of the rotors and displaced from the low pressure zone at inlet 79 to the high pressure zone at outlet 80.

Figure 4:
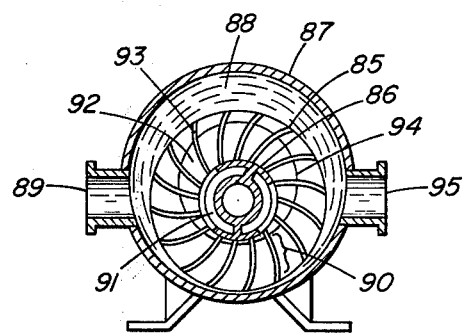
FIG. 4 is a side sectional view of the second stage liquid ring compressor utilized in the systems shown in FIGS. 1 and 2.

The second stage liquid ring compressors 20 and 48 respectively of the systems shown in FIGS. 1 and 2 are also identical and shown in FIG. 4 having one rotating part, a bladed rotor 85 which rotates freely and without metal-to-metal contact around a stationary port cylinder 86. The rotor 85 and port cylinder 86 are concentric but the casing 87 has an eccentric lob 88 formed therein. Sufficient sealing distillate is supplied through inlet 89 to form liquid ring 90 inside the casing 87 conforming to the eccentric contour of casing 87. The port cylinder 86 is provided with an inlet port 91 located such that it corresponds to the position at which liquid ring 90 is receded away from port cylinder 86 thereby defining chamber 92 between rotor vanes or blades 93 in which vapor entering inlet 89 is trapped. As rotation continues the chamber volume is reduced by compression caused by the liquid ring 90 as it is being forced by the casing 87 contour radially inward toward the port cylinder 86. At the end of the compression stroke the vapor is compressed by liquid ring 90 and forced into the discharge port 94 of the port cylinder 86. The vapor and a portion of the sealing water is then discharged from pump outlet 95 to the condenser or tubes in the evaporator in the system.

I claim:

1. A vapor compression system including in combination an evaporator vessel, heat exchange tube within said vessel, first and second ends of said heat exchange tube, a rotary positive displacement compressor, an outlet of said vessel, first conduit means communicating said outlet with said rotary compressor, a liquid ring compressor, interstage conduit means communicating said rotary compressor with said ring compressor, second conduit means communicating said ring compressor with said first end of said heat exchange tube, a distillate receiving vessel, and third conduit means communicating said second end of said heat exchange tube with said distillate receiving vessel.

2. A vapor compression system in accordance with claim 1 including heat exchanger means, a distillate pump for pumping distillate from said distillate receiving vessel through said heat exchanger means to outlet, an incoming conduit passing through said heat exchanger means and communicating with said evaporator vessel to allow incoming feedwater to receive heat given up by the distillate as it passes through said heat exchanger means, and a solution pump for pumping solution from said evaporator vessel through said heat exchanger means to drain counter to the flow of incoming feedwater whereby the incoming feedwater is preheated prior to its introduction into said evaporator vessel.

3. A vapor compression system in accordance with claim 1 in which said rotary positive displacement compressor includes counter rotating lobe members rotating within a casing whereby vapor is displaced through said rotary compressor and discharged into said interstage conduit means and said liquid ring compressor is provided with a seal water connection whereby distillate is continuously fed into the liquid ring compressor, the distillate sealing liquid acting as fluid compressant, desuperheater and condensing medium.

4. A vapor compression system in accordance with claim 1 in which said liquid ring compressor includes an eccentric casing, a bladed rotor within said casing, centrally located inlet and discharge ports of said casing respectively connected to said interstage conduit means and said second conduit means whereby a liquid ring is formed within the contour of said eccentric casing due to centrifugal force and which alternately recedes from said inlet port and moves inward toward said discharge port to draw vapor from said inlet port and discharge it in said outlet port.

5. A vapor compression system in accordance with claim 1 in which said rotary positive displacement compressor includes counter rotating lobe members rotating within a casing whereby vapor is displaced through said rotary compressor and discharged into said interstage conduit means and said liquid ring compressor is provided with a seal water connection whereby distillate is continuously fed into the liquid ring compressor, the distillate sealing liquid acting as fluid compressant, desuperheater and condensing medium and in which said liquid ring compressor includes an eccentric casing, a bladed rotor within said casing, centrally located inlet and discharge ports of said casing respectively connected to said interstage conduit means and said second conduit means whereby a liquid ring is formed within the contour of said eccentric casing due to centrifugal force and which alternately recedes from said inlet port and moves inward toward said discharge port to draw vapor from said inlet port and discharge it in said outlet port.

6. A vapor compression system in accordance with claim 1 in which a spray nozzle is provided within said interstage conduit means and means are provided to supply said spray nozzle with distillate from said distillate receiving vessel for introduction of the distillate into the stream in said interstage conduit means.

7. A vapor compression system in accordance with claim 5 in which a spray nozzle is provided within said interstage conduit means and means are provided to supply said spray nozzle with distillate from said distillate receiving vessel for introduction of the distillate into the stream in said interstage conduit means.

8. A vapor compression system in accordance with claim 1 including a heat exchanger apparatus comprising an evaporator section in which vapors are formed and discharged into said heat exchanger means whereby heat of condensation is given up to feed solution passing therethrough.

* * * * *